(12) United States Patent
Clark et al.

(10) Patent No.: US 12,552,540 B1
(45) Date of Patent: Feb. 17, 2026

(54) AIRCRAFT AIR SYSTEM WITH ELECTRIC BOOST COMPRESSOR

(71) Applicant: RTX Corporation, Farmington, CT (US)

(72) Inventors: Thomas E. Clark, Wells, ME (US); Murat Yazici, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/047,165

(22) Filed: Feb. 6, 2025

(51) Int. Cl.
*F02C 7/141* (2006.01)
*B64D 13/02* (2006.01)
*F02C 6/08* (2006.01)
*F02C 7/18* (2006.01)

(52) U.S. Cl.
CPC ............... *B64D 13/02* (2013.01); *F02C 6/08* (2013.01); *F02C 7/141* (2013.01); *F02C 7/18* (2013.01); *F05D 2220/323* (2013.01); *F05D 2220/76* (2013.01); *F05D 2260/213* (2013.01)

(58) Field of Classification Search
CPC . B64D 13/02; F02C 6/08; F02C 7/141; F02C 7/143; F02C 7/18; F05D 2220/323; F05D 2220/76; F05D 2260/213
See application file for complete search history.

(56) References Cited

U.S. PATENT DOCUMENTS

| | | | |
|---|---|---|---|
| 8,063,501 B2 | 11/2011 | Finney | |
| 10,662,960 B2 | 5/2020 | Ricordeau | |
| 11,421,604 B2 | 8/2022 | Woods | |
| 11,473,497 B2 | 10/2022 | Schwarz | |
| 2013/0040545 A1 | 2/2013 | Finney | |
| 2017/0106985 A1* | 4/2017 | Stieger | B64D 13/02 |
| 2020/0240327 A1* | 7/2020 | Menheere | F02C 7/18 |
| 2021/0070453 A1 | 3/2021 | Kocherry | |

* cited by examiner

*Primary Examiner* — Steven M Sutherland
(74) *Attorney, Agent, or Firm* — Getz Balich LLC

(57) ABSTRACT

An aircraft system includes a turbine engine and an air system. The turbine engine includes a compressor section, a combustor section and a turbine section. A flowpath extends through the compressor section, the combustor section and the turbine section. A first rotating structure includes a first compressor rotor disposed in the compressor section. A second rotating structure includes a second compressor rotor disposed in the compressor section along the flowpath between the first compressor rotor and the combustor section. The air system includes an air circuit and an electric boost compressor. A circuit inlet into the air circuit is fluidly coupled to the flowpath and disposed along the second compressor rotor. The air circuit projects out from the circuit inlet and extends through the electric boost compressor.

18 Claims, 5 Drawing Sheets

AIRCRAFT AIR SYSTEM WITH ELECTRIC BOOST COMPRESSOR

BACKGROUND OF THE DISCLOSURE

1. Technical Field

This disclosure relates generally to an aircraft and, more particularly, to an air system for the aircraft.

2. Background Information

An aircraft and its propulsion system(s) may include various onboard air systems. One such air system provides pressurized air to an environmental control system for the aircraft. Various types and configurations of air systems are known in the art. While these air systems have various benefits, there is still room in the art for improvement.

SUMMARY OF THE DISCLOSURE

According to an aspect of the present disclosure, a system is provided for an aircraft. This aircraft system includes a turbine engine and an air system. The turbine engine includes a compressor section, a combustor section, a turbine section, a flowpath, a first rotating structure and a second rotating structure. The flowpath extends through the compressor section, the combustor section and the turbine section from an airflow inlet into the flowpath to a combustion products exhaust from the flowpath. The first rotating structure includes a first compressor rotor disposed in the compressor section. The second rotating structure is rotationally independent of the first rotating structure. The second rotating structure includes a second compressor rotor disposed in the compressor section along the flowpath between the first compressor rotor and the combustor section. The air system includes an air circuit and an electric boost compressor. A circuit inlet into the air circuit is fluidly coupled to the flowpath and disposed along the second compressor rotor. The air circuit projects out from the circuit inlet and extends through the electric boost compressor.

According to another aspect of the present disclosure, another system is provided for an aircraft. This aircraft system includes a turbine engine, an air system and an electric machine. The turbine engine includes a compressor section, a combustor section, a turbine section, a flowpath and a rotating structure. The flowpath extends through the compressor section, the combustor section and the turbine section from an airflow inlet into the flowpath to a combustion products exhaust from the flowpath. The rotating structure includes a bladed engine rotor disposed in the compressor section or the turbine section. The air system includes an air circuit and an electric boost compressor. A circuit inlet into the air circuit is fluidly coupled to the flowpath and disposed along the compressor section. The air circuit projects out from the circuit inlet and extends through the electric boost compressor. The electric machine is electrically coupled to the electric boost compressor through an electrical system. The electric machine includes an electric machine rotor operatively coupled to the rotating structure. The electric machine is configurable as an electric generator wherein the rotating structure drives rotation of the electric machine rotor. The electric machine is configurable as an electric motor wherein the electric machine rotor inputs mechanical power into the rotating structure.

According to still another aspect of the present disclosure, another system is provided for an aircraft. This aircraft system include a propulsor rotor, an engine core, an engine case, a nacelle structure and an air system. The engine core includes a compressor section, a combustor section and a turbine section. The engine core is configured to power rotation of the propulsor rotor. A flowpath extends through the compressor section, the combustor section and the turbine section from an airflow inlet into the flowpath to a combustion products exhaust from the flowpath. The engine case houses the engine core. The nacelle structure provides an aerodynamic cover over the engine case. A compartment is radially between and is formed by the engine case and the nacelle structure. The air system includes an air circuit and an electric boost compressor. A circuit inlet into the air circuit is fluidly coupled to the flowpath and is disposed along the compressor section. The air circuit projects out from the circuit inlet and extends through the electric boost compressor. The electric boost compressor is disposed in the compartment.

The circuit inlet may be disposed along an upstream half of the second compressor rotor.

The circuit inlet may be disposed along an upstream third of the second compressor rotor.

The electric boost compressor may be configured as an upstream-most fluid control device along the air circuit.

The air system may be configured without a valve along the air circuit between the circuit inlet and the electric boost compressor.

The air system may also include a valve fluidly coupled inline along the air circuit downstream of the circuit inlet.

The valve may be downstream of the electric boost compressor along the air circuit.

The valve may be an over-pressure valve.

The air system may also include a heat exchanger fluidly coupled inline along the air circuit downstream of the valve.

The air system may also include a heat exchanger fluidly coupled inline along the air circuit downstream of the electric boost compressor.

The turbine engine may also include a fan section, a bypass flowpath and an engine core. The bypass flowpath may be fluidly coupled with and downstream of the fan section. The bypass flowpath may bypass the engine core. The engine core may include the compressor section, the combustor section and the turbine section. The heat exchanger may be configured to transfer heat energy between compressed air flowing through the air circuit and cooling air received from the bypass flowpath.

The heat exchanger may be configured as a precooler for an environmental control system for the aircraft.

All air received by the electric boost compressor through the air circuit may be directed into the air circuit from the flowpath through the circuit inlet.

The electric boost compressor may be configured as a single stage compressor rotor.

The electric boost compressor may be configured as a multi-stage compressor rotor.

The electric boost compressor may be disposed in a compartment radially outboard of and adjacent an engine core of the turbine engine. The engine core may include the compressor section, the combustor section and the turbine section.

The system may also include a motor-generator electrically coupled to the electric boost compressor. The motor-generator may be mechanically coupled to the first rotating structure or the second rotating structure.

The system may also include a ducted propulsor rotor. The turbine engine may be configured to drive rotation of the ducted propulsor rotor.

The system may also include an open propulsor rotor. The turbine engine may be configured to drive rotation of the open propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
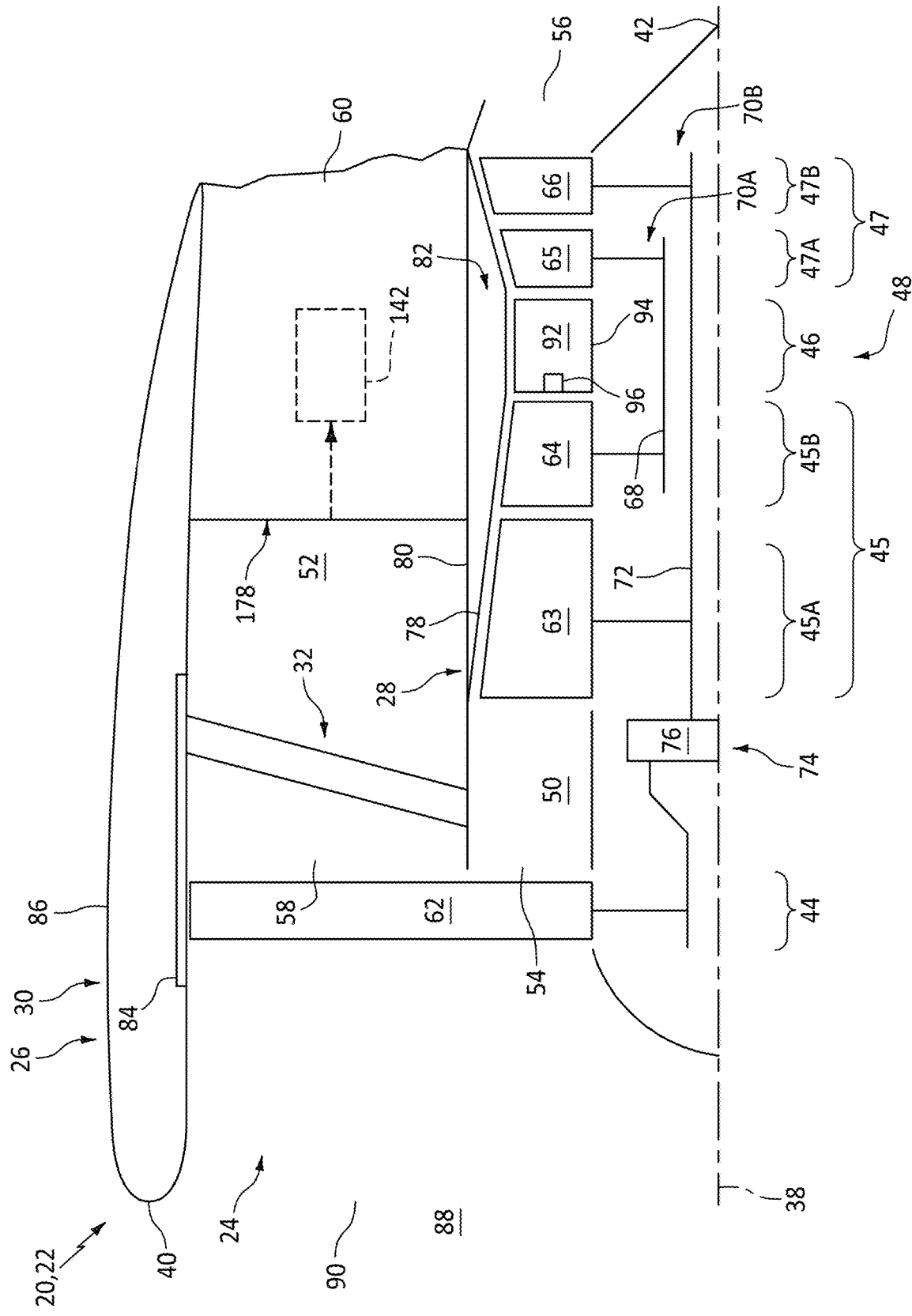
FIG. 1 is a partial schematic illustration of an aircraft propulsion system with a ducted propulsor rotor.

FIG. 1 illustrates a powerplant 20 for an aircraft. The aircraft may be an airplane, a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary housing structure 26, which housing structure 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 also includes an electric machine system 34 (see FIG. 2) and an air system 36 (see FIG. 3). The aircraft propulsion system 22 extends axially along an axis 38 between an axial upstream, forward end 40 of the aircraft propulsion system 22 and an axial downstream, aft end 42 of the aircraft propulsion system 22. Briefly, the propulsion system axis 38 may be a centerline axis of the aircraft propulsion system 22, the turbine engine 24 and/or one or more of its members. The propulsion system axis 38 may also or alternatively be a rotational axis for one or more members of the turbine engine 24.

The aircraft propulsion system 22 and its turbine engine 24 of FIG. 1 include a propulsor section 44 (e.g., a fan section), a compressor section 45, a combustor section 46 and a turbine section 47. The compressor section 45 of FIG. 1 includes a low pressure compressor (LPC) section 45A and a high pressure compressor (HPC) section 45B. The turbine section 47 of FIG. 1 includes a high pressure turbine (HPT) section 47A and a low pressure turbine (LPT) section 47B. At least (or only) the LPC section 45A, the HPC section 45B, the combustor section 46, the HPT section 47A and the LPT section 47B collectively form a core 48 (e.g., a gas generator) of the turbine engine 24. The aircraft propulsion system 22 and its turbine engine 24 of FIG. 1 also include a core flowpath 50 (e.g., an annular core flowpath) and a bypass flowpath 52 (e.g., an annular bypass flowpath). The core flowpath 50 extends sequentially through the LPC section 45A, the HPC section 45B, the combustor section 46, the HPT section 47A and the LPT section 47B from an airflow inlet 54 into the core flowpath 50 to a combustion products exhaust 56 out from the core flowpath 50. The bypass flowpath 52 extends through a bypass duct from an airflow inlet 58 into the bypass flowpath 52 to an airflow exhaust 60 from the bypass flowpath 52, where the bypass duct may be formed by the inner housing structure 28 and the outer housing structure 30. The bypass flowpath 52 and its bypass duct are configured to bypass (e.g., are disposed radially outboard of and extend along) the engine core 48 and the inner housing structure 28.

The propulsor section 44, the LPC section 45A, the HPC section 45B, the combustor section 46, the HPT section 47A and the LPT section 47B may be arranged sequentially along the propulsion system axis 38 within the housing structure 26. The propulsor section 44 includes a bladed propulsor rotor 62; e.g., a fan rotor. The LPC section 45A includes a bladed low pressure compressor (LPC) rotor 63. The HPC section 45B includes a bladed high pressure compressor (HPC) rotor 64. The HPT section 47A includes a bladed high pressure turbine (HPT) rotor 65. The LPT section 47B includes a bladed low pressure turbine (LPT) rotor 66. Each of these engine rotors 62-66 includes a rotor base (e.g., a disk or a hub) and a plurality of rotor blades (e.g., airfoils, vanes, etc.). The rotor blades may be arranged into one or more stages axially along the respective engine rotor 62-66. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 64 is coupled to and rotatable with the HPT rotor 65. The HPC rotor 64 of FIG. 1, for example, is connected to the HPT rotor 65 through a high speed shaft 68. At least (or only) the HPC rotor 64, the HPT rotor 65 and the high speed shaft 68 collectively form a high speed rotating structure 70A; e.g., a high speed spool of the turbine engine 24 and its engine core 48. This high speed rotating structure 70A of FIG. 1 and its members 64, 65 and 68 are rotatable about the propulsion system axis 38. However, it is contemplated the high speed rotating structure 70A may alternatively be rotatable about another axis radially and/or angularly offset from the rotational axis of the propulsor rotor 62 and/or the centerline axis of the turbine engine 24.

The LPC rotor 63 is coupled to and rotatable with the LPT rotor 66. The LPC rotor 63 of FIG. 1, for example, is connected to the LPT rotor 66 through a low speed shaft 72. At least (or only) the LPC rotor 63, the LPT rotor 66 and the low speed shaft 72 collectively form a low speed rotating structure 70B; e.g., a low speed spool of the turbine engine 24 and its engine core 48. This low speed rotating structure 70B of FIG. 1 and its members 63, 66 and 72 are rotatable about the propulsion system axis 38. However, it is contemplated the low speed rotating structure 70B may alternatively be rotatable about another axis radially and/or angularly offset from the rotational axis of the propulsor rotor 62 and/or the centerline axis of the turbine engine 24.

The low speed rotating structure 70B is coupled to the propulsor rotor 62 through a drivetrain 74. The drivetrain 74 may be configured as a geared drivetrain, where a geartrain 76 (e.g., a transmission, a speed change device, an epicyclic geartrain, etc.) is disposed between and operatively couples the propulsor rotor 62 to the low speed rotating structure 70B and its LPT rotor 66. With this arrangement, the propulsor rotor 62 may rotate at a different (e.g., slower) rotational speed than the low speed rotating structure 70B and its LPT rotor 66. Here, the propulsor rotor 62 and the low speed rotating structure 70B may rotate in a common (the same) direction about the propulsion system axis 38 or in opposite directions about the propulsion system axis 38 depending, for example, upon the specific configuration of the geartrain 76. Alternatively, the drivetrain 74 may be configured as a direct-drive drivetrain, where the geartrain 76 is omitted. With such an arrangement, the propulsor rotor 62 rotates at a common (the same) rotational speed as the low speed rotating structure 70B and its LPT rotor 66.

The inner housing structure 28 of FIG. 1 includes an inner case 78 (e.g., a core case) for the turbine engine 24, an inner nacelle structure 80 (sometimes referred to as an inner fixed structure (IFS)) and an internal inner housing compartment 82 (e.g., an engine core compartment). The inner case 78 is disposed radially outboard of, extends axially along and may circumscribe one or more or all of the engine sections 45A-47B and the engine rotors 63-66. The inner case 78 may thereby house and provide a support structure for the respective engine sections 45A-47B and the engine rotors 63-66. The inner nacelle structure 80 is configured to provide an aerodynamic cover over the engine core 48 and its inner case 78. The inner housing compartment 82 of FIG. 1 is formed by and is disposed radially between the inner case 78 and an inner barrel of the inner nacelle structure 80. The inner housing structure 28 and its inner nacelle structure 80 may also form a radial inner peripheral boundary of the bypass flowpath 52.

The outer housing structure 30 of FIG. 1 includes an outer case 84 (e.g., a fan case) for the turbine engine 24 and an outer nacelle structure 86. The outer case 84 is disposed radially outboard of, extends axially along and may circumscribe the propulsor section 44 and its propulsor rotor 62. The outer case 84 may thereby house and may be configured as a containment structure for the propulsor section 44 and its propulsor rotor 62. The outer nacelle structure 86 is configured to provide an aerodynamic cover over the outer case 84. The outer housing structure 30 and its outer nacelle structure 86 may also form a radial outer peripheral boundary of the bypass flowpath 52.

During operation of the aircraft propulsion system 22 of FIG. 1, ambient air from an environment 88 external to the aircraft and its aircraft propulsion system 22 enters the aircraft propulsion system 22 and its turbine engine 24 through an airflow inlet 90. This air is propelled by the rotating propulsor rotor 62 in a downstream, aft direction towards the propulsion system aft end 42.

An outer stream of the air propelled by the rotating propulsor rotor 62 is directed into the bypass flowpath 52 through its bypass inlet 58, which air entering the bypass flowpath 52 may be referred to as "bypass air". The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 60 to provide forward thrust. The propulsion of the bypass air may account for a majority of the forward thrust generated by the aircraft propulsion system 22 and its turbine engine 24 of FIG. 1.

An inner stream of the air propelled by the rotating propulsor rotor 62 is directed into the core flowpath 50 through its core inlet 54, which air entering the core flowpath 50 may be referred to as "core air". This core air is compressed by the LPC rotor 63 and the HPC rotor 64 and is directed into a combustion chamber 92 (e.g., annular combustion chamber) of a combustor 94 (e.g., annular combustor) in the combustor section 46. Fuel is injected into the combustion chamber 92 by one or more fuel injectors 96 and mixed with the compressed core air to provide a fuel-air mixture. This fuel-air mixture is ignited and combustion products thereof flow through and sequentially drive rotation of the HPT rotor 65 and the LPT rotor 66. The rotation of the HPT rotor 65 and the LPT rotor 66 respectively drive rotation of the HPC rotor 64 and the LPC rotor 63 and, thus, compression of the air received from the core inlet 54. The rotation of the LPT rotor 66 also drives rotation of the propulsor rotor 62 through the drivetrain 74.

Figure 2:
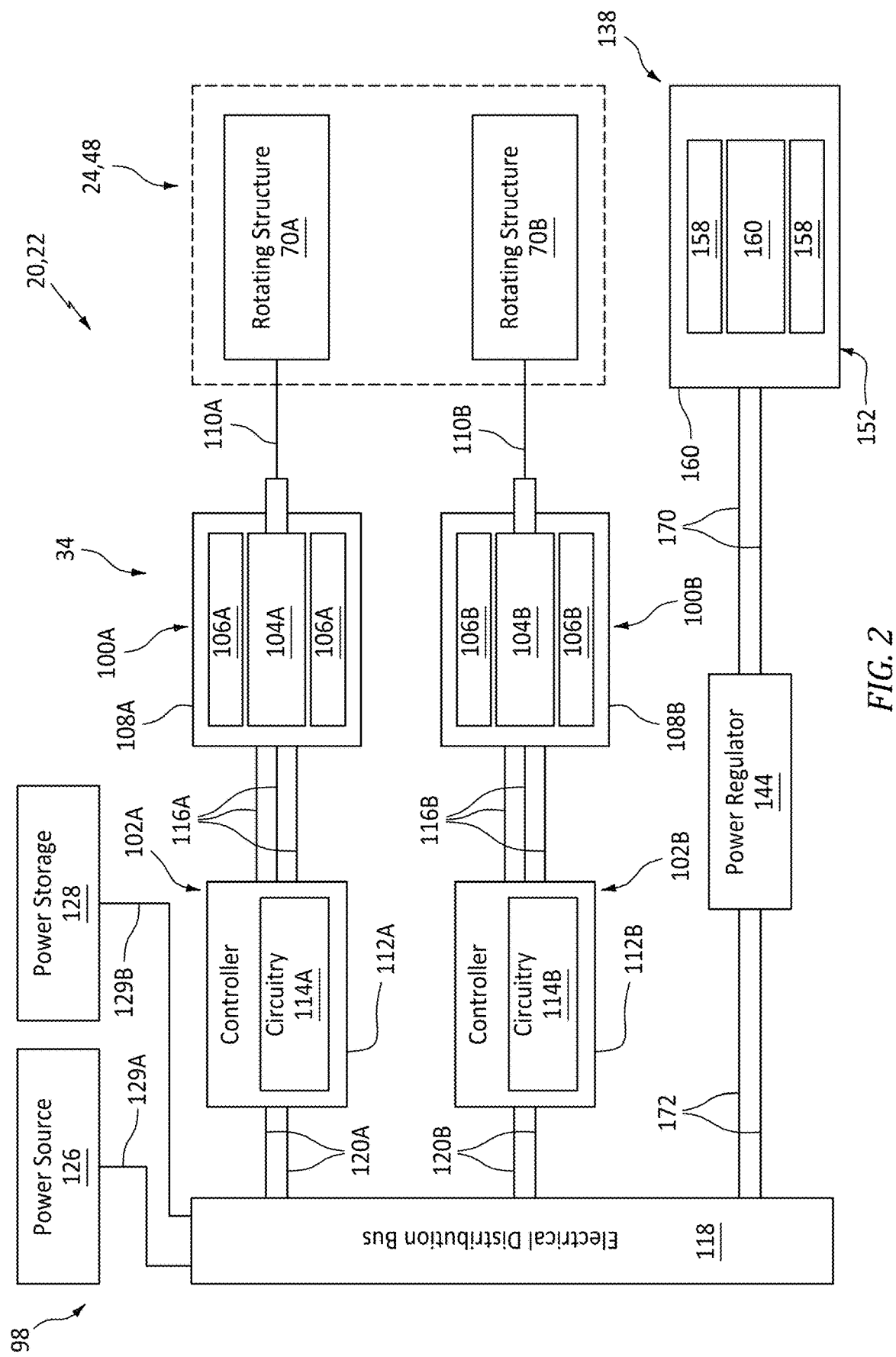
FIG. 2 is a schematic illustration of a portion of the aircraft propulsion system with an electric machine system.

Referring to FIG. 2, the electric machine system 34 is electrically coupled to an electrical system 98 for the aircraft and its aircraft propulsion system 22. The electric machine system 34 of FIG. 2 includes one or more electric machines 100A and 100B (generally referred to as "100") and one or more electric machine (EM) controllers 102A and 102B (generally referred to as "102"). For ease of description, each electric machine 100 of FIG. 2 is described below as being electrically coupled to, controlled by and/or otherwise associated with a single, dedicated one of the EM controllers 102. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines.

Each electric machine 100A, 100B of FIG. 2 includes an electric machine rotor 104A, 104B (generally referred to as "104"), an electric machine stator 106A, 106B (generally referred to as "106") and an electric machine housing 108A, 108B (generally referred to as "108"); e.g., a case. The machine rotor 104 is rotatable about a rotational axis of the machine rotor 104, which rotational axis may also be an axial centerline of the electric machine 100. The machine stator 106 of FIG. 2 is radially outboard of and circumscribes the machine rotor 104. With this arrangement, each electric machine 100 is configured as a radial flux electric machine. The electric machines 100 of the present disclosure, however, are not limited to such an exemplary rotor-stator configuration nor to radial flux arrangements. The machine rotor 104, for example, may alternatively be radially outboard of and circumscribe the machine stator 106. In another example, the machine rotor 104 may be axially next to the machine stator 106 configuring the respective electric machine 100 as an axial flux electric machine. Referring again to FIG. 2, the machine rotor 104 and the machine stator 106 are at least partially or completely housed within an interior of the machine housing 108.

Each electric machine 100A, 100B may be operatively coupled to a respective one of the engine rotating structures 70A, 70B (generally referred to as "70"). Each machine rotor 104 of FIG. 2, for example, is mechanically coupled to and rotatable with the respective engine rotating structure 70A, 70B through a drivetrain 110A, 110B (generally referred to as "110"). This drivetrain 110 may be configured as or otherwise include a shaft, a tower shaft assembly, an accessory gearbox, an angle gearbox, and/or the like. For ease of description, each machine rotor 104 of FIG. 2 is described below as being coupled to and rotatable with a unique one of the engine rotating structures 70 of the turbine engine 24. However, it is contemplated multiple machine rotors may alternatively be coupled to and rotatable with a common engine rotating structure. It is also contemplated a single one of the machine rotors may be coupled to and rotatable with multiple engine rotating structures, directly or through another device such as a differential or a clutch system.

Each electric machine 100 of FIG. 2 may be configurable as an electric motor and/or an electric generator; e.g., an electric motor-generator. For example, during a motor mode of operation, a respective one of the electric machines 100 may operate as the electric motor to convert electricity received from the aircraft electrical system 98 into mechanical power. The machine stator 106, for example, may generate an electromagnetic field with the machine rotor 104 using a current of electricity received from the aircraft electrical system 98 through the respective EM controller 102. This electromagnetic field may drive rotation of the machine rotor 104. The machine rotor 104, in turn, may provide mechanical power to and drive rotation of the respective engine rotating structure 70 through the respective drivetrain 110. This mechanical power may be provided to boost power or completely power the rotation of the respective engine rotating structure 70. By contrast, during a generator mode of operation, the respective electric machine 100 may operate as the electric generator to convert mechanical power received from the respective engine rotating structure 70 into electricity. Rotation of the machine rotor 104, for example, may be rotationally driven by rotation of the respective engine rotating structure 70 through the respective drivetrain 110. The rotation of the machine rotor 104 may generate an electromagnetic field with the machine stator 106, and the machine stator 106 may convert energy from the electromagnetic field into electricity. The respective electric machine 100 may then provide a current of electricity to the aircraft electrical system 98 through the respective EM controller 102 for storage and/or further use. The electric machines 100 of the present disclosure, however, are not limited to such exemplary operation. For example, one, some or all of the electric machines 100 may alternatively each be configured as a dedicated electric generator; e.g., without the electric motor functionality. In another example, one, some or all of the electric machines 100 may alternatively each be configured as a dedicated electric motor; e.g., without the electric generator functionality.

Each EM controller 102A, 102B includes a controller housing 112A, 112B (generally referred to as "112") and internal controller circuitry 114A, 114B (generally referred to as "114"). The controller housing 112 may be configured as an enclosed case (e.g., a closed or sealed container) for the respective controller circuitry 114. The controller circuitry 114 is disposed within an interior of the controller housing 112; e.g., an internal chamber or other volume(s) within and enclosed by the controller housing 112. The controller circuitry 114 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), processing device(s), memory module(s), communication module(s), electrical transformer(s), electrical rectifier(s), and/or the like.

Each EM controller 102A, 102B is electrically coupled to a respective one of the electric machines 100A, 100B through one or more electric cables 116A, 116B (generally referred to as "116"); e.g., high voltage electric cables, power feeder cables, etc. More particularly, the controller circuitry 114 of each EM controller 102 is electrically coupled to the respective electric machine 100 and its machine stator 106 through the respective electric cables 116. Similarly, each EM controller 102A, 102B is electrically coupled to an electrical distribution bus 118 of the aircraft electrical system 98 through one or more electric cables 120A, 120B (generally referred to as "120"); e.g., high voltage electric cables, power feeder cables, etc. More particularly, the controller circuitry 114 of each EM controller 102 is electrically coupled to the aircraft electrical system 98 and its electrical distribution bus 118 through the respective electric cables 120.

Each EM controller 102 and its controller circuitry 114 are configured to control operation of a respective one of the electric machines 100. For example, when operating as the electric motor, the respective EM controller 102 and its controller circuitry 114 are configured to regulate a flow of electricity from the aircraft electrical system 98 to the respective electric machine 100. This electricity flow regulation may include: (a) turning-on the flow of electricity from the aircraft electrical system 98 to the respective electric machine 100 (e.g., electrically coupling the respective electric machine 100 to the aircraft electrical system 98); (b) turning-off the flow of electricity from the aircraft electrical system 98 to the respective electric machine 100 (e.g., electrically decoupling the respective electric machine 100 from the aircraft electrical system 98); (c) moderating the flow of electricity from the aircraft electrical system 98 to the respective electric machine 100. Here, the respective EM controller 102 operates as a motor controller. In another example, when operating as the electric generator, the respective EM controller 102 and its controller circuitry 114 are configured to regulate a flow of electricity from the respective electric machine 100 to the aircraft electrical system 98. This electricity flow regulation may include: (a) turning-on the flow of electricity from the respective electric machine 100 to the aircraft electrical system 98 (e.g., electrically coupling the respective electric machine 100 to the aircraft electrical system 98); (b) turning-off the flow of electricity from the respective electric machine 100 to the aircraft electrical system 98 (e.g., electrically decoupling the respective electric machine 100 from the aircraft electrical system 98); (c) moderating the flow of electricity from the respective electric machine 100 to the aircraft electrical system 98. Here, the respective EM controller 102 operates as a generator controller.

The aircraft electrical system 98 includes the electrical distribution bus 118. This aircraft electrical system 98 may also include a power source 126 and/or a power storage 128. The electrical distribution bus 118 is electrically coupled to each of the electric machines 100 through their respective EM controllers 102. The electrical distribution bus 118 is also electrically coupled to the power source 126 and the power storage 128, schematically shown via lines 129A and 129B respectively. With this arrangement, the electrical distribution bus 118 provides an intermediate connection between the various electrical aircraft propulsion system members 100A (via 102A), 100B (via 102B), 126 and/or 128. The power source 126 may be an electric generator powered by the turbine engine 24 or an electric generator powered by another aircraft powerplant; e.g., an engine of a companion aircraft propulsion system, an engine of an auxiliary power unit (APU), a fuel cell system, etc. The power storage 128 is configured to receive electricity from the electrical distribution bus 118 for storage. The power storage 128 is also configured to provide the stored electricity to the electrical distribution bus 118. The power storage 128, for example, may be configured as or otherwise include one or more electricity storage devices; e.g., batteries, super capacitors, etc.

Figure 3:
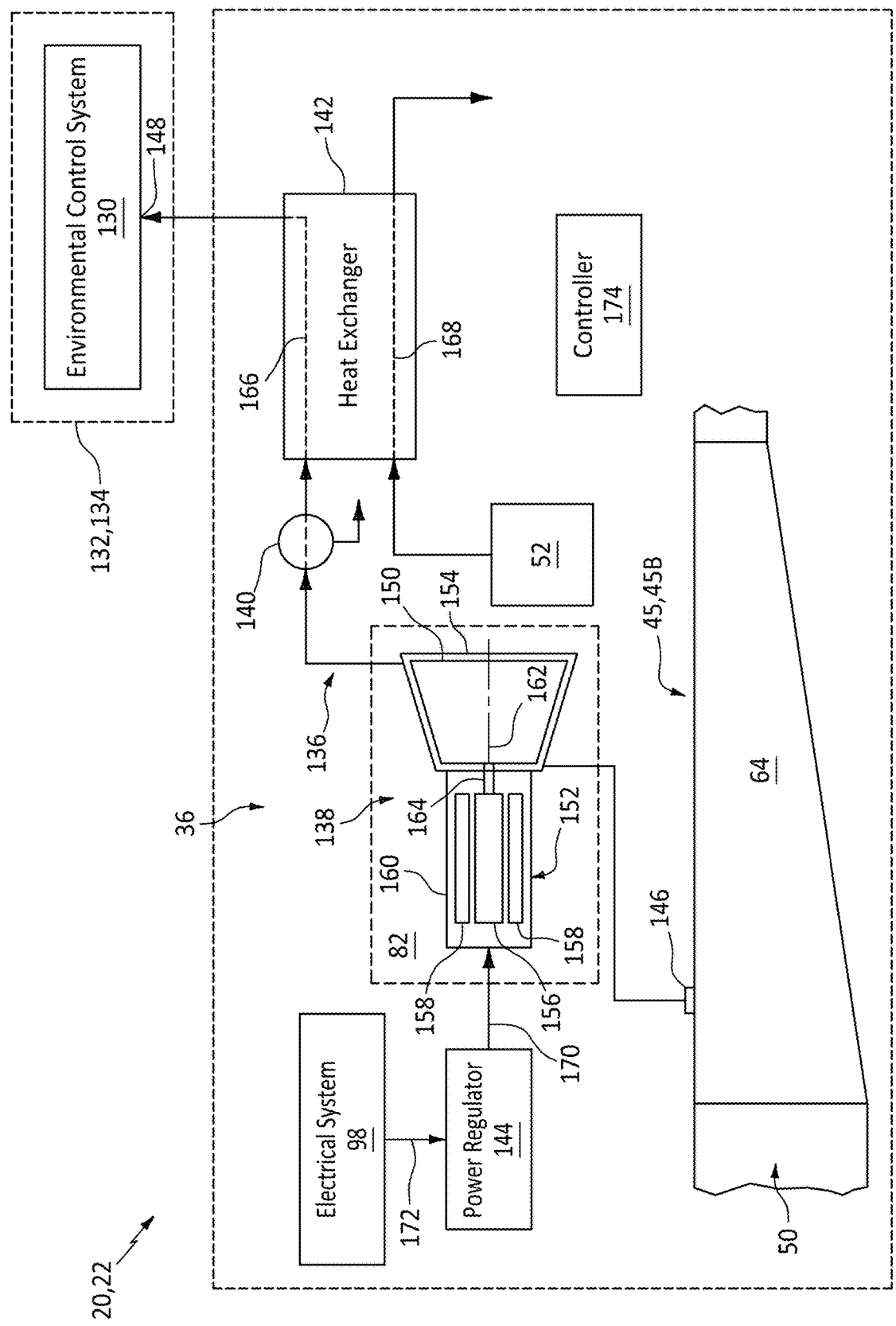
FIG. 3 is a schematic illustration of a portion of the aircraft propulsion system with an air system coupled to an environmental control system for an aircraft.

Referring to FIG. 3, the air system 36 is configured to provide pressurized air to an environmental control system 130 (ECS) for a cabin within a fuselage 132 of the aircraft; e.g., a cockpit, a passenger cabin, etc. This air system 36 may be dedicated to providing its pressurized air to the environmental control system 130. The present disclosure, however, is not limited to such an exemplary arrangement. The air system 36, for example, may also (or alternatively) provide the pressurized air to one or more other components and/or systems of the aircraft arranged onboard and/or part of an airframe 134 of the aircraft. The air system 36 may still also (or alternatively) provide the pressurized air to one or more components and/or systems of the aircraft propulsion system 22. Referring again to FIG. 3, the air system 36 includes an air circuit 136 (e.g., an air passage), an electric boost compressor 138, a valve 140 and a heat exchanger 142. The air system 36 of FIG. 3 also includes an electrical power regulator 144 to control operation of the air system 36 and its boost compressor 138.

The air circuit 136 may be configured as an airflow passage fluidly coupling the core flowpath 50 to the environmental control system 130. The air circuit 136 of FIG. 3, for example, extends longitudinally from an airflow inlet 146 into the air circuit 136 to an airflow inlet 148 into the environmental control system 130. This air circuit 136 of FIG. 3 extends longitudinally from the circuit inlet 146, sequentially through the boost compressor 138, the valve 140 and the heat exchanger 142, and out of the aircraft propulsion system 22 to the environmental control system 130 and its environmental control system (ECS) inlet 148. The circuit inlet 146 is disposed along the core flowpath 50 in the compressor section 45. The circuit inlet 146 of FIG. 3, for example, is disposed along the core flowpath 50 in the HPC section 45B. More particularly, the circuit inlet 146 of FIG. 3 is disposed along an upstream half (½), third (⅓) or quarter (¼) of the HPC rotor 64. This circuit inlet 146 may be configured as or otherwise include a bleed port (or multiple bleed ports) and/or a scoop (or multiple scoops) in and/or along a radial outer peripheral boundary of the core flowpath 50 longitudinally overlapping the HPC rotor 64. The present disclosure, however, is not limited to such an exemplary arrangement. For example, the circuit inlet 146 may alternatively be disposed upstream of the HPC rotor 64 along the core flowpath 50; e.g., between the LPC rotor 63 and the HPC rotor 64 of FIG. 1.

The boost compressor 138 is configured to boost (e.g., increase) a pressure and/or a flow rate of air flowing through the air circuit 136 and provided to the downstream environmental control system 130. The boost compressor 138 of FIG. 3, for example, includes a compressor rotor 150 and an electric motor 152.

The compressor rotor 150 is disposed within a compressor housing 154. The compressor rotor 150 includes a compressor base (e.g., a disk or a hub) and a plurality of compressor blades (e.g., airfoils, vanes, etc.). The compressor blades are arranged circumferentially around the compressor base in one or more annular arrays. Each of the compressor blades is connected to the compressor base. Each of the compressor blades projects spanwise (e.g., radially) out from the compressor base, into a flowpath of the air circuit 136 within the compressor housing 154, to a distal tip of the respective compressor blade.

The electric motor 152 includes an electric motor rotor 156, an electric motor stator 158 and an electric motor housing 160; e.g., a case. The motor rotor 156 is rotatable about a rotational axis 162 of the boost compressor 138 and its members 150 and 156. The motor rotor 156 is operatively coupled to the compressor rotor 150 through a drivetrain 164; e.g., a driveshaft or a splined coupling. The motor stator 158 of FIG. 3 is radially outboard of and circumscribes the motor rotor 156. With this arrangement, each electric motor 152 is configured as a radial flux electric motor. The electric motor 152 of the present disclosure, however, is not limited to such an exemplary rotor-stator configuration nor to radial flux arrangements. The motor rotor 156, for example, may alternatively be radially outboard of and circumscribe the motor stator 158. In another example, the motor rotor 156 may be axially next to the motor stator 158 configuring the electric motor 152 as an axial flux electric motor. Referring again to FIG. 3, the motor rotor 156 and the motor stator 158 are at least partially or completely housed within an interior of the motor housing 160.

During boost compressor operation, the electric motor 152 converts electricity received from the aircraft electrical system 98 into mechanical power. The motor stator 158, for example, may generate an electromagnetic field with the motor rotor 156 using a current of electricity received from the aircraft electrical system 98 through the power regulator 144; e.g., a controller for the electric motor 152. This electromagnetic field may drive rotation of the motor rotor 156. The motor rotor 156, in turn, may provide mechanical power to and drive rotation of the compressor rotor 150 through the drivetrain 164. This rotation of the compressor rotor 150 compresses the air within the air circuit 136. Using the electric motor 152 to drive the rotation of the compressor rotor 150 divorces operation of the boost compressor 138 from other mechanical and/or fluid systems of the aircraft propulsion system 22. The boost compressor 138 may thereby be utilized to provide a controlled, tuned and/or continuous flow of the pressurized air to the downstream environmental control system 130 even as the rotating structures 70 of FIG. 1 speed up or slow down. Of course, where the pressure of the compressed core air bled from the core flowpath 50 is high enough to facilitate environmental control system operation, it is contemplated the electric motor 152 of FIG. 3 may be turned off (e.g., de-energized) so as to allow the compressor rotor 150 to windmill. Moreover, it is further contemplated the electric motor 152 may (or may not) alternatively be selectively operated as an electric generator such that the boost compressor 138 operationally functions as a flow regulation valve reducing air bled from the core flowpath 50.

The valve 140 may be configured as an over-pressure valve. The valve 140, for example, may be configured to selectively dump some of the air pressurized by the HPC section 45B and/or the boost compressor 138 such that the pressurized air provided to the downstream environmental control system 130 does not rise above a certain (e.g., maximum) operative threshold. The air dumped (e.g., bled off) by the valve 140 may be directed into the bypass flowpath 52 (see FIG. 1) or another volume within or outside of the aircraft propulsion system 22.

The heat exchanger 142 of FIG. 3 includes a plurality of fluidly discrete internal passages 166 and 168. The air system passage 166 of FIG. 3 is part of and is thereby fluidly coupled inline with the air circuit 136. The cooling passage 168 of FIG. 3 is configured to receive a cooling fluid such as, but not limited to, air bled from the bypass flowpath 52. These internal passages 166 and 168 may be arranged to provide the heat exchanger 142 with a parallel flow configuration, a cross-flow configuration, a counterflow configuration, or a hybrid configuration including any two or more of the foregoing configurations. With this arrangement, the heat exchanger 142 is configured to exchange heat energy between (a) the pressurized air flowing through the air circuit 136 and its air system passage 166 and (b) the cooling fluid (e.g., the bled bypass air) flowing through the cooling passage 168. Note, while the heat exchanger 142 is shown in FIG. 3 with a single air system passage 166 and a single cooling passage 168 for ease of illustration, it is to be understood the heat exchanger 142 may include a network of the air system passages and/or a network of the cooling passages.

Referring to FIG. 2, the power regulator 144 is electrically coupled to the electric motor 152 through one or more electric cables 170; e.g., high voltage electric cables, power feeder cables, etc. The power regulator 144 is further electrically coupled to the electrical distribution bus 118 of the aircraft electrical system 98 through one or more electric cables 172; e.g., high voltage electric cables, power feeder cables, etc. Referring to FIG. 3, the power regulator 144 is thereby electrically coupled between the aircraft electrical system 98 and the electric motor 152. This power regulator 144 may be configured as or otherwise include a switch (e.g., a contactor) and/or another current regulating device operable to selectively direct and/or regulate an electrical current from the aircraft electrical system 98 to the electric motor 152. The power regulator 144 may thereby be utilized to regulate operation (e.g., turn-on, turn-off, maintain speed, speed up, slow down, etc.) of the electric motor 152.

An onboard electronic controller 174 may be in signal communication with the power regulator 144. This electronic controller 174 may signal the power regulator 144 to selectively transfer electricity between the aircraft electrical system 98 and the electric motor 152 utilizing an open-loop control schedule or a closed-loop control schedule. This control schedule may be tuned based on one or more aircraft parameters such as, but not limited to, aircraft altitude, aircraft speed (e.g., Mach number), internal engine temperature (e.g., in the HPC section 45B), internal flowpath pressure (e.g., in the HPC section 45B), ambient air temperature, ambient air pressure, high speed rotating structure speed, etc. The aircraft parameter(s) may be measured, derived from an onboard model, relayed from a control program and/or otherwise obtained.

Figure 5:
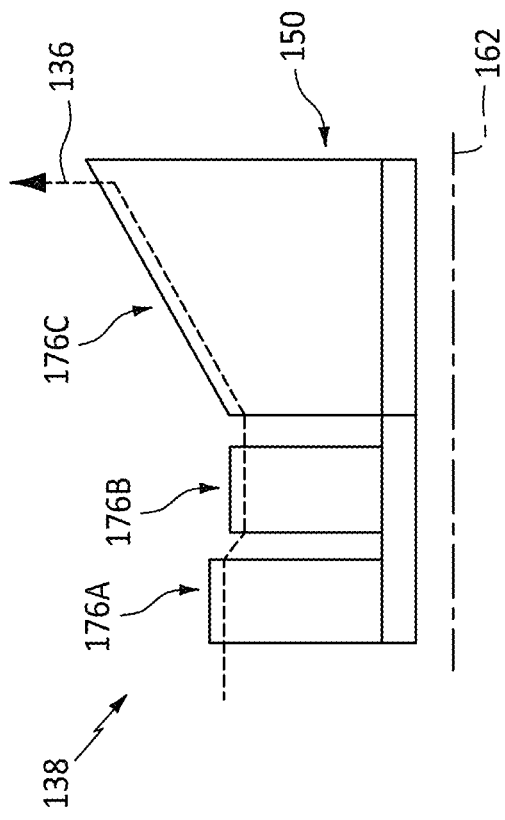
FIGS. 4 and 5 are partial schematic illustrations of various boost compressor rotor arrangements.
Figure 4:
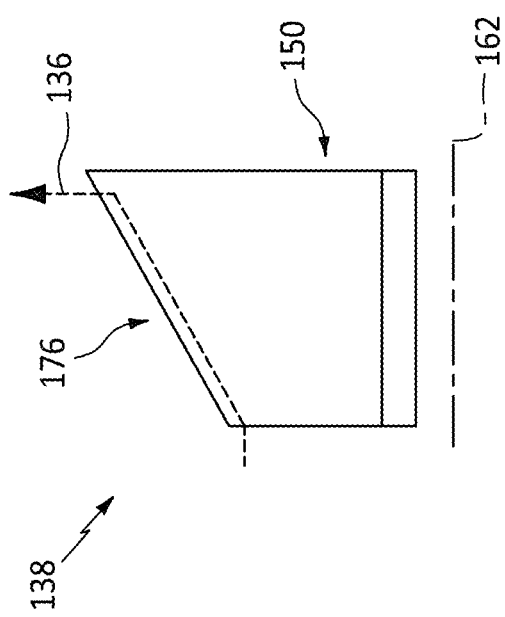

In some embodiments, referring to FIG. 4, the compressor rotor 150 may be configured with a single stage 176 (e.g., a single array) of its compressor blades. Here, the compressor rotor 150 may be configured as a radial flow compressor. In other embodiments, referring to FIG. 5, the compressor rotor 150 may be configured with multiple stages 176A-C of its compressor blades. Here, the upstream stages 176A and 176B are each configured as axial flow compressor stages. The downstream stage 176C is configured as a radial flow compressor stage. The present disclosure, however, is not limited to such exemplary compressor rotor arrangements.

In some embodiments, referring to FIG. 1, the heat exchanger 142 may be configured in a vane structure 178 extending radially across the bypass flowpath 52. This vane structure 178 may be configured as a bifurcation (e.g., an upper bifurcation or a lower bifurcation) that circumferentially bifurcates a longitudinal section of the bypass flowpath 52. Of course, it is contemplated the heat exchanger 142 may alternatively be located elsewhere within the aircraft propulsion system 22 or even offboard of the aircraft propulsion system 22; e.g., within a pylon structure mounting the aircraft propulsion system 22 to the aircraft airframe 134.

In some embodiments, the heat exchanger 142 of FIG. 3 may be configured as an air-to-air heat exchanger as generally described above. In such embodiments, following passage through the heat exchanger 142, the air may be directed into an internal compartment (e.g., the inner housing compartment 82 of FIG. 1), an internal flowpath (e.g., the bypass flowpath 52 of FIG. 1) and/or any other internal volume of the aircraft propulsion system 22. Alternatively, the air may be directed into the external environment 88 (see FIG. 1) or another volume outside of the aircraft propulsion system 22. In other embodiments, however, it is contemplated the heat exchanger 142 may alternatively be configured as a liquid-to-air heat exchanger where, for example, the cooling fluid is coolant, lubricant, fuel, hydraulic fluid and/or another liquid working fluid utilized within the aircraft propulsion system 22 and/or otherwise onboard the aircraft.

The aircraft propulsion system 22 of FIG. 1 is described above as a ducted propulsor propulsion system; e.g., the turbofan propulsion system. The present disclosure, however, is not limited to such an exemplary aircraft propulsion system. For example, referring to FIG. 6, the outer housing structure 30 (see FIG. 1) may be omitted from the housing structure 26 to open the propulsor rotor 62 up to the external environment 88. More particularly, the propulsor rotor 62 of FIG. 6 includes a plurality of open propulsor blades 180 arranged circumferentially about the propulsion system axis 38 in an array; e.g., a circular array. This array of the propulsor blades 180 may be unshrouded or alternatively shrouded by a tubular propulsor rotor shroud dedicated to the propulsor rotor 62 for example. Each of these propulsor blades 180 projects spanwise (e.g., radially) out from a base of the propulsor rotor 62, into the external environment 88, to a distal tip 182 of the respective propulsor blade 180. Each propulsor blade 180 is thereby configured as an un-ducted propulsor blade which is exposed to (e.g., disposed in) the surrounding external environment 88. With this arrangement, the propulsor rotor 62 is an open propulsor rotor (e.g., an un-ducted propulsor rotor) and the aircraft propulsion system 22 is configured as an open rotor propulsion system. Moreover, the inner housing structure 28 and its nacelle structure 80 may form an exterior of the aircraft propulsion system 22 and may border the external environment 88.

The guide vane structure 32 may also be open to the external environment 88 forming an open guide vane structure. This guide vane structure 32 of FIG. 6 includes a plurality of open exit guide vanes 184; e.g., airfoils. The guide vanes 184 are arranged and may (or may not) be equispaced circumferentially about the propulsion system axis 38 in an array; e.g., a circular array. This array of the guide vanes 184 may be unshrouded or alternatively shrouded by a tubular guide vane shroud dedicated to the guide vane structure 32 for example. This guide vane structure 32 and its guide vanes 184 are arranged axially next to (e.g., adjacent) the propulsor rotor 62 and its propulsor blades 180. The guide vane structure 32 and its guide vanes 184 of FIG. 6, for example, are arranged downstream of the propulsor rotor 62 and its propulsor blades 180, without (e.g., any) other elements axially therebetween to obstruct, turn and/or otherwise influence the air propelled by the propulsor rotor 62 to the guide vane structure 32. Each of the guide vanes 184 projects radially out from an exterior surface of the inner housing structure 28, into the external environment 88, to a distal tip 186 of the respective guide vane 184. Each guide vane 184 is thereby configured as an un-ducted guide vane which is exposed to (e.g., disposed in) the surrounding external environment 88. With the foregoing arrangement, the guide vane structure 32 and its guide vanes 184 are configured to condition (e.g., straighten out, de-swirl, etc.) an outer stream of air propelled by the propulsor rotor 62 within the external environment 88 that bypass the engine core 48. Of course, in other embodiments, the guide vane structure 32 may be omitted where, for example, the aircraft propulsion system 22 is alternatively configured as a counter-rotating open rotor (CROR) aircraft propulsion system, etc.

Figure 6:
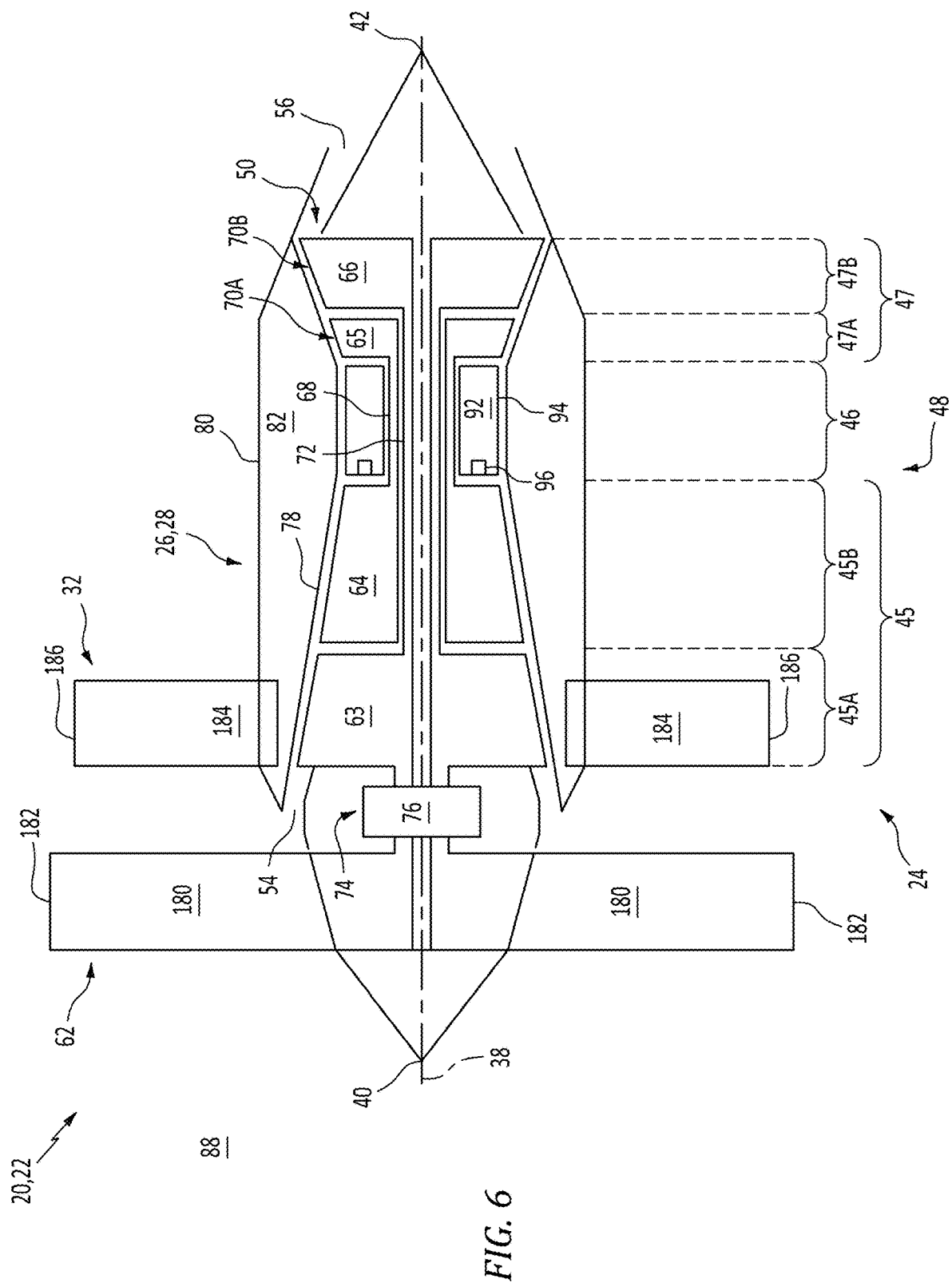
FIG. 6 is a partial schematic illustration of the aircraft propulsion system with an open propulsor rotor.

While the turbine engine 24 in FIG. 1 and FIG. 6 is shown with a particular two rotating structure arrangement, the present disclosure is not limited thereto. For example, the LPC rotor 63 may be omitted to configure the LPT rotor 66 as a power turbine (PT) rotor for the propulsor rotor 62. In another example, the turbine engine 24 may also include another rotating structure; e.g., an intermediate speed spool for the turbine engine 24 and its engine core 48.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
a turbine engine including a compressor section, a combustor section, a turbine section, a flowpath, a first rotating structure and a second rotating structure, the flowpath extending through the compressor section, the combustor section and the turbine section from an airflow inlet into the flowpath to a combustion products exhaust from the flowpath, the first rotating structure comprising a first compressor rotor disposed in the compressor section, the second rotating structure rotationally independent of the first rotating structure, and the second rotating structure comprising a second compressor rotor disposed in the compressor section along the flowpath between the first compressor rotor and the combustor section; and
an air system including an air circuit, an electric boost compressor and a valve, a circuit inlet into the air circuit fluidly coupled to the flowpath and disposed along the second compressor rotor, the air circuit projecting out from the circuit inlet and extending through the electric boost compressor, the valve fluidly coupled inline along the air circuit downstream of the circuit inlet, and the valve comprising an over-pressure valve.

2. The system of claim 1, wherein the circuit inlet is disposed along an upstream half of the second compressor rotor.

3. The system of claim 1, wherein the circuit inlet is disposed along an upstream third of the second compressor rotor.

4. The system of claim 1, wherein the electric boost compressor is configured as an upstream-most fluid control device along the air circuit.

5. The system of claim 1, wherein the air system is configured without a valve along the air circuit between the circuit inlet and the electric boost compressor.

6. The system of claim 1, wherein the valve is downstream of the electric boost compressor along the air circuit.

7. The system of claim 1, wherein the air system further includes a heat exchanger fluidly coupled inline along the air circuit downstream of the valve.

8. The system of claim 1, wherein the air system further includes a heat exchanger fluidly coupled inline along the air circuit downstream of the electric boost compressor.

9. The system of claim 8, wherein
the turbine engine further includes a fan section, a bypass flowpath and an engine core;
the bypass flowpath is fluidly coupled with and downstream of the fan section, and the bypass flowpath bypasses the engine core;
the engine core includes the compressor section, the combustor section and the turbine section; and
the heat exchanger is configured to transfer heat energy between compressed air flowing through the air circuit and cooling air received from the bypass flowpath.

10. The system of claim 9, wherein the heat exchanger is configured as a precooler for an environmental control system for the aircraft.

11. The system of claim 1, wherein the electric boost compressor comprises a single stage compressor rotor.

12. The system of claim 1, wherein the electric boost compressor comprises a multi-stage compressor rotor.

13. The system of claim 1, wherein
the electric boost compressor is disposed in a compartment radially outboard of and adjacent an engine core of the turbine engine; and
the engine core includes the compressor section, the combustor section and the turbine section.

14. The system of claim 1, further comprising:
a motor-generator electrically coupled to the electric boost compressor;
the motor-generator mechanically coupled to the first rotating structure or the second rotating structure.

15. The system of claim 1, further comprising:
a ducted propulsor rotor;
the turbine engine configured to drive rotation of the ducted propulsor rotor.

16. The system of claim 1, further comprising:
an open propulsor rotor;
the turbine engine configured to drive rotation of the open propulsor rotor.

17. A system for an aircraft, comprising:
a turbine engine including a compressor section, a combustor section, a turbine section, a flowpath and a rotating structure, the flowpath extending through the compressor section, the combustor section and the turbine section from an airflow inlet into the flowpath to a combustion products exhaust from the flowpath, the rotating structure comprising a bladed engine rotor disposed in the compressor section or the turbine section;

an air system including an air circuit and an electric boost compressor, a circuit inlet into the air circuit fluidly coupled to the flowpath and disposed along the compressor section, and the air circuit projecting out from the circuit inlet and extending through the electric boost compressor; and an electric machine electrically coupled to the electric boost compressor through an electrical system, the electric machine comprising an electric machine rotor operatively coupled to the rotating structure, the electric machine configurable as an electric generator wherein the rotating structure drives rotation of the electric machine rotor, and the electric machine configurable as an electric motor wherein the electric machine rotor inputs mechanical power into the rotating structure.

18. A system for an aircraft, comprising:

a propulsor rotor;

an engine core including a compressor section, a combustor section and a turbine section, the engine core configured to power rotation of the propulsor rotor, wherein a flowpath extends through the compressor section, the combustor section and the turbine section from an airflow inlet into the flowpath to a combustion products exhaust from the flowpath;

an engine case housing the engine core;

a nacelle structure providing an aerodynamic cover over the engine case, and a compartment radially between and formed by the engine case and the nacelle structure; and an air system including an air circuit and an electric boost compressor, a circuit inlet into the air circuit fluidly coupled to the flowpath and disposed along the compressor section, the air circuit projecting out from the circuit inlet and extending through the electric boost compressor, and the electric boost compressor disposed in the compartment.

* * * * *